US008168883B2

(12) United States Patent
Clark

(10) Patent No.: US 8,168,883 B2
(45) Date of Patent: May 1, 2012

(54) ADJUSTABLE SOLAR POWERER

(76) Inventor: Moses Clark, Alexandria, VA (US)

( * ) Notice: Subject to any disclaimer, the term of this patent is extended or adjusted under 35 U.S.C. 154(b) by 332 days.

(21) Appl. No.: 12/465,758

(22) Filed: May 14, 2009

(65) Prior Publication Data
US 2009/0293933 A1 Dec. 3, 2009

Related U.S. Application Data

(60) Provisional application No. 61/056,970, filed on May 29, 2008.

(51) Int. Cl.
H01L 31/042 (2006.01)
H01L 31/00 (2006.01)
H02N 6/00 (2006.01)

(52) U.S. Cl. ........ 136/245; 136/244; 136/251; 136/252; 136/258; 136/259; 136/261; 136/291

(58) Field of Classification Search ............. 136/244, 136/245, 251, 252, 258, 259, 261, 291
See application file for complete search history.

(56) References Cited

U.S. PATENT DOCUMENTS

| 2,989,575 | A * | 6/1961 | Wallace, Jr. | 136/246 |
| 6,046,400 | A * | 4/2000 | Drummer | 136/244 |
| 7,026,541 | B2 * | 4/2006 | Heidrich | 136/251 |

* cited by examiner

Primary Examiner — Basia Ridley
Assistant Examiner — Lindsey Bernier
(74) Attorney, Agent, or Firm — Ziegler IP Law Group, LLC

(57) ABSTRACT

An adjustable solar powerer having photovoltaic cells made of either silicon, polycrystalline or single-crystalline located on a stabilizing base converts solar power or artificial light into electric energy. This solar powerer is made up of unilateral flat and movable elements, each having unilaterally installed photovoltaic cells, these elements being connected with each other by a yoke and catch at one end, the yoke and pivot being connected to a tripod.

14 Claims, 2 Drawing Sheets

ADJUSTABLE SOLAR POWERER

BACKGROUND

1. Field

The present invention is an Adjustable Solar Powerer that converts either solar power or artificial light into electric energy. Depending on whether it is constructed as a small mobile collapsible unit or a large stationary base unit the solar powerer as such can convert enough electrical energy to sustain various types of desired specified voltage.

2. Brief Description of Related Developments

The existing powerer photovoltaic cells comprising panels made of, but not limited to, solar photovoltaic materials, such as silicon, crystalline or polycrystalline. These panels are joined in parallel or in series, which contain support structures, the yoke, and pivot for adapting the appropriate angle or tilt of panels.

BRIEF DESCRIPTION OF THE DRAWINGS

The foregoing aspects and other features of the embodiments are explained in the following description, taken in connection with the accompanying drawings, wherein.

DESCRIPTION OF THE DISCLOSED EMBODIMENTS

Figure 1:
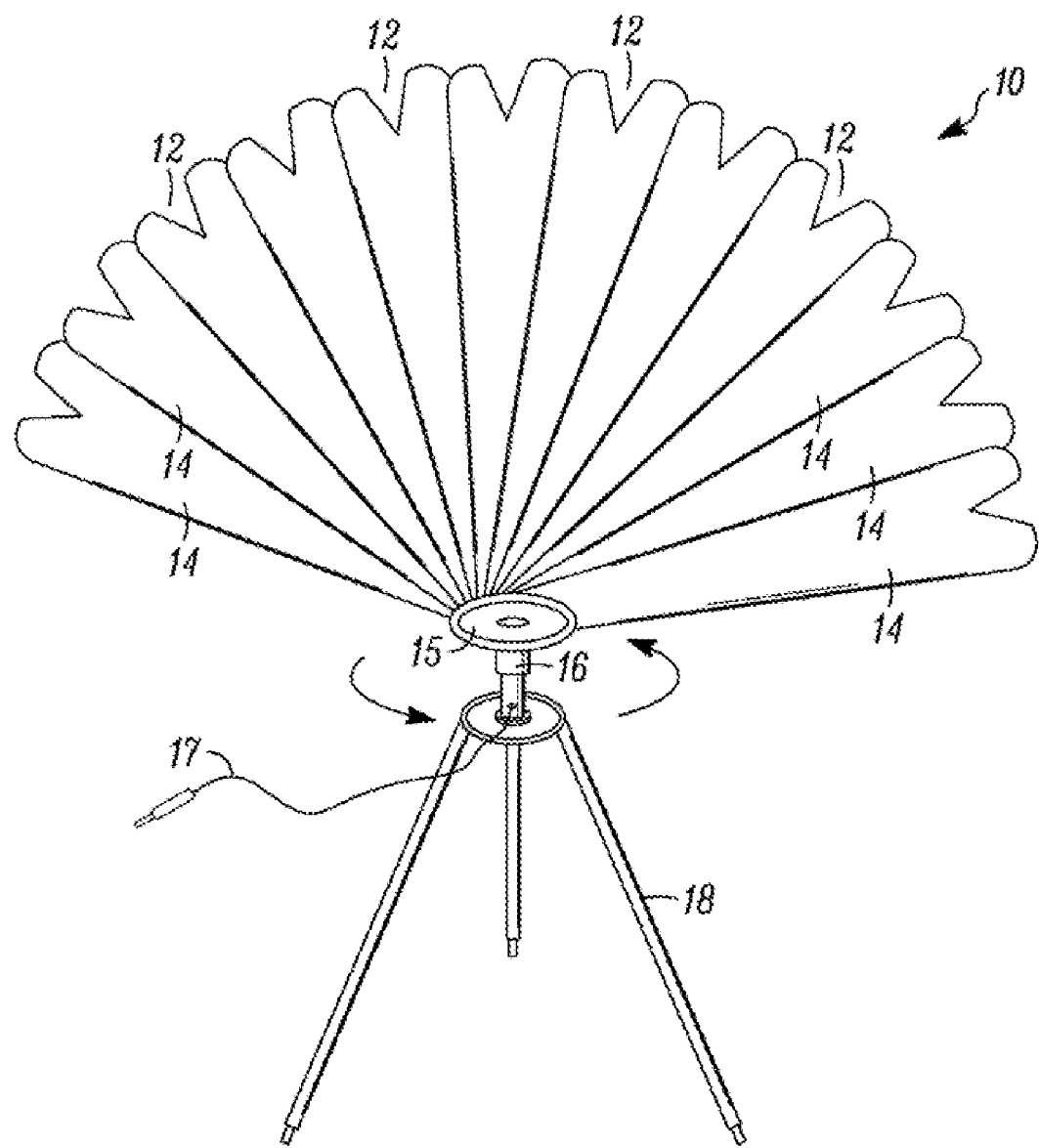
FIG. 1 is an illustration of the solar powerer having fans partially opened
Figure 2:
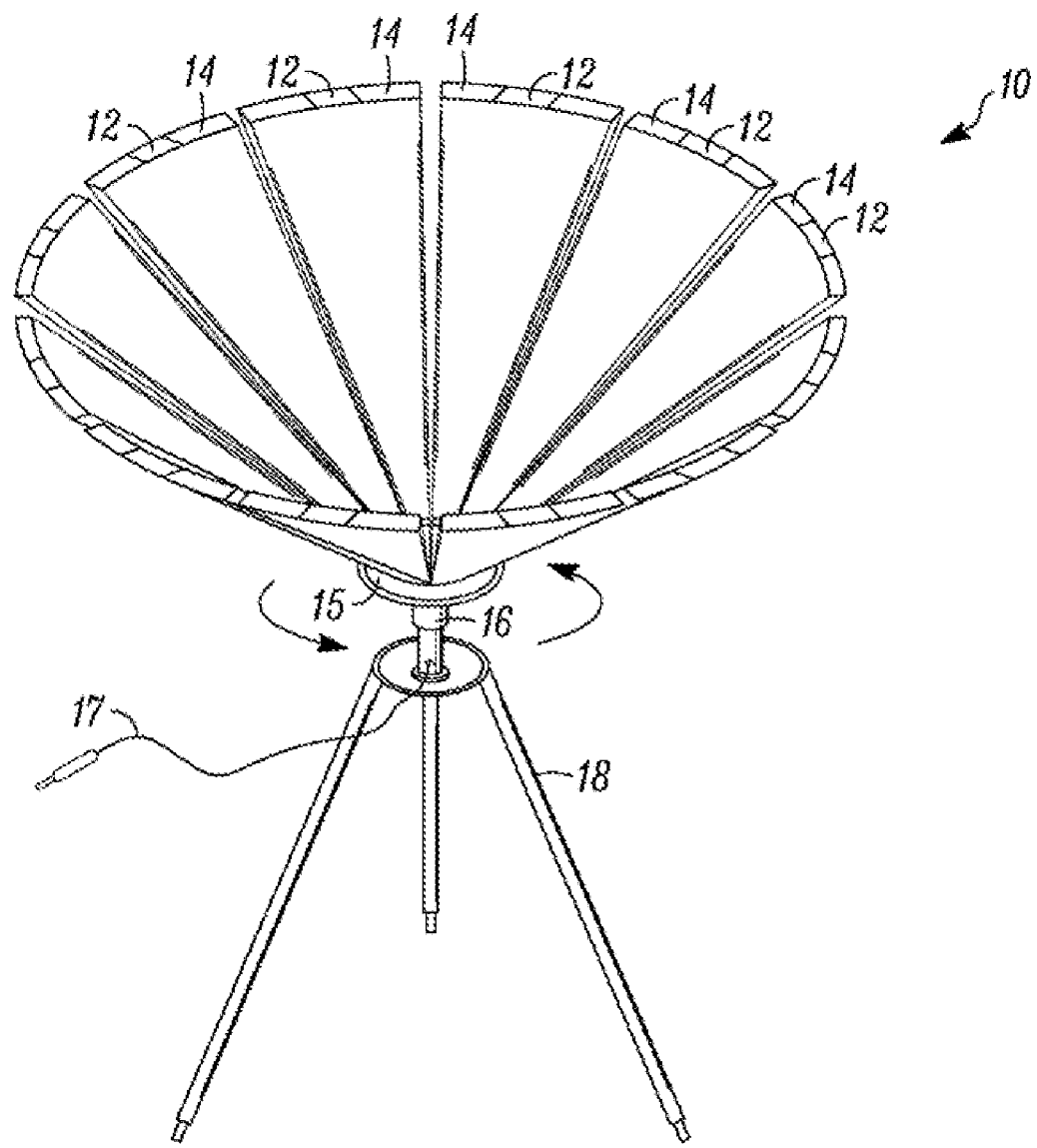
FIG. 2 is an illustration of the solar powerer having fans fully opened

The utility model has been presented in FIGS. 1 and 2.

The adjustable solar powerer 10 comprises flat elements 14 arranged one behind the other, in a fan like structure. Unilateral photovoltaic cells 12 are situated on each of the flat elements 14. All of the flat elements 14 comprising the solar cells 12 are connected with each other at one end by means of a catch or yoke 15. The adjustable solar powerer 10 is connected by movable pivot 16 to the telescopic stand or tripod base 18 and each of the telescopic legs extending there from ends in a stabilizing base.

As shown in the figures, reference 10 illustrates the overall structure of the disclosed embodiments. Reference 12 are the photovoltaic cells, reference 14 are the fans, reference 15 is the yoke, reference 16 is the pivot, reference 17 is the cord, and reference 18 is the tripod base.

The adjustable solar powerer photovoltaic cells 12 are installed unilaterally on flat, stiff load-bearing elements 14 resembling rectangles. These elements 14 are connected to each other at a single fixed pivot point 16, located near one of the shorted element edges. This point of connection of the elements 14 with installed photovoltaic cells 12 constitutes the axis of rotation of these elements. The location of the flat elements 14 with respect to each other during operation is creates a fan-like bowl shape having an optimal angle for the collection of solar or artificial light. The axis of rotation of the elements is connected by a pivot 16 with a revolving yoke 15, which is attached either to a telescopic or fixed tripod base 18. This base 18 allows the solar cell to stand on any flat base or uneven terrain, or even on a rucksack when traveling.

The length of the load-bearing elements 14 of the photovoltaic cells 12 should not exceed that of the first external tubular piece of the telescopic base 18. This length facilitates the simple arrangement of the adjustable solar powerer 10 into a small flat package in the shape of a rectangle or oval cylinder, which does not occupy much space and considerably simplifies transport. This feature is optimal for transporting or storing the solar powerer, for example, in a small rucksack or computer carrying case.

Each of the movable flat elements 14 has photovoltaic cells 12 installed along nearly the entire external area of the plane. These photovoltaic cells when connected are fitted with a system of typical connection sockets that can supply direct energy from 6 to 12 volts or more, or when drawn through a regular to supply on demand the converted stored electrical energy into the desired voltage. Once the work of the cell is completed, it can be collapsed, forming a small rectangular cube that is easy to store. The telescopic tripod 18 stand, when folded, occupies very little room.

In conditions where it is not possible to connect to an electricity network source, the adjustable solar powerer can be set up using its telescopic mast with the flat elements of the cell spread out near and directed to the artificial light rays thereby providing direct electrical power.

The adjustable solar powerer 10 can be made of various lightweight alloys, such as but not limited to stainless steel, aluminum or PVC. The solar powerer when used resembles a bowl or inverted umbrella rectangles. The elements are connected with each other at a single fixed pivot point. This point of connection of elements with installed photovoltaic cells constitutes the axis of rotation of the elements.

The location of the bow shaped elements with respect to each other during operation of the device is bowl-like for collection of solar energy or artificial light. The axis of rotation of the element is connected to a pivot with a revolving yoke, which is attached to a telescopic tripod base. The solar powerer can also be made larger and stationary.

What is claimed is:

1. A solar element device that converts solar power or artificial light into electric energy, comprising:
   a telescopic tripod base unit;
   a pivot element coupled to the tripod base unit; and
   a rotatable yoke rotatably coupled to the pivot element;
   a plurality of flat, movable, fanlike elements, each fanlike element movably coupled at one end to the movable yoke, a surface of each fanlike element having photovoltaic cells coupled thereto, the photovoltaic cells being made of silicon, either polycrystalline or single-crystalline silicon, wherein in an operational state, the fanlike elements form a bowl shape extending away from the rotatable yoke.

2. The solar element device of claim 1, wherein a length of each of the flat fanlike elements does not exceed a length of a first external tubular piece of the telescopic tripod base.

3. The solar element device of claim 1, wherein a system of photovoltaic cells of each of the flat fanlike elements is fitted with a system of connection sockets to supply, from either solar energy or artificial light, direct energy or through a regular supply on demand, converted electrical energy into a desired specified voltage.

4. The solar element device of claim 1, the device having a folded state, where each of the movable fanlike elements is configured to be moved so that each fanlike element is substantially stacked, one fanlike element on top of another fanlike element, and during the operational state, each movable fanlike element moves with respect to the yoke to create the bowl shape with the surfaces of each fanlike element that includes the photovoltaic cells facing away from the tripod base.

5. The solar element device of claim 4, wherein in the operational state the plurality of movable fanlike elements in the bowl shape is configured to be rotated about the pivot element.

6. The solar element device of claim 4, wherein the plurality of movable fanlike elements and the tripod base, in the folded state, form a rectangular package.

7. The solar element device of claim 4, wherein in the folded state, a shape of the folded movable fanlike elements and tripod base forms a cube structure.

8. A rotatable solar energy collection device comprising:

a tripod base;

a rotatable member coupled to the tripod base; and a plurality of elements movably coupled to the rotatable member, each element having photovoltaic cells arranged on a surface thereof, the plurality of elements being movable between a stowed position, in which each element is arranged in a substantially stacked position relative to another element, and an operational position in which each of the plurality of elements form a cone shape, with the surfaces of the elements including the photovoltaic cells facing toward an interior of the cone.

9. The device of claim 8, wherein an end of each element coupled to the rotatable member is electrically coupled to the photovoltaic cells and to each other.

10. The device of claim 9, wherein in the operational position, the plurality of elements in the cone shape is rotatable about the rotatable member.

11. The device of claim 8, wherein each of the elements is substantially in the shape of a rectangle, one end of each rectangle element being connected to another rectangle on the rotatable member.

12. The device of claim 11, wherein an other end of each rectangle extends upwards, away from the rotatable element, and at an angle of greater than 0 degrees and less than 90 degrees relative to the rotatable member.

13. The device of claim 8, wherein the device comprises a lightweight alloy material.

14. The device of claim 13, wherein the lightweight alloy material comprises stainless steel, aluminum or PVC.

* * * * *